US012707486B2

(12) United States Patent
Sun et al.

(10) Patent No.: US 12,707,486 B2
(45) Date of Patent: Aug. 11, 2026

(54) USER EQUIPMENT (UE) AND METHOD FOR REPORTING TO THE NETWORK AN INDICATION THAT A SINGLE PHYSICAL UPLINK CONTROL CHANNEL (PUCCH) GROUP HAVING A PLURALITY OF COMPONENT CARRIERS (CC) USING MORE THAN FOUR NUMEROLOGIES ACROSS THE CCs IS SUPPORTED

(71) Applicant: Apple Inc., Cupertino, CA (US)

(72) Inventors: Haitong Sun, Cupertino, CA (US); Amir Aminzadeh Gohari, Sunnyvale, CA (US); Amir Farajidana, Sunnyvale, CA (US); Dawei Zhang, Saratoga, CA (US); Hong He, San Jose, CA (US); Leilei Song, Sunnyvale, CA (US); Mariam Motamed, Redwood City, CA (US); Ruoheng Liu, San Diego, CA (US); Wei Zeng, Saratoga, CA (US); Wenshu Zhang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 971 days.

(21) Appl. No.: 17/593,605

(22) PCT Filed: Oct. 13, 2020

(86) PCT No.: PCT/CN2020/120666

§ 371 (c)(1),
(2) Date: Sep. 21, 2021

(87) PCT Pub. No.: WO2022/077225

PCT Pub. Date: Apr. 21, 2022

(65) Prior Publication Data

US 2022/0312405 A1 Sep. 29, 2022

(51) Int. Cl.
*H04W 72/0453* (2023.01)
*H04L 5/00* (2006.01)
(Continued)

(52) U.S. Cl.
CPC ............ *H04W 72/51* (2023.01); *H04L 5/001* (2013.01); *H04L 27/26025* (2021.01);
(Continued)

(58) Field of Classification Search
CPC . H04W 72/51; H04W 72/21; H04W 72/0453; H04W 36/1446; H04L 27/26025;
(Continued)

(56) References Cited

U.S. PATENT DOCUMENTS

2016/0270063 A1* 9/2016 Chen ..................... H04L 5/0053
2019/0036673 A1 1/2019 Chen et al.
(Continued)

FOREIGN PATENT DOCUMENTS

CN 107395329 A 11/2017
CN 107534942 1/2018
(Continued)

OTHER PUBLICATIONS

ETSI, "TS 138 306 V15.10.0", Jul. 2020, pp. 1-68 (Year: 2020).*
(Continued)

*Primary Examiner* — Salvador E Rivas
(74) *Attorney, Agent, or Firm* — Fay Kaplun & Marcin, LLP

(57) ABSTRACT

A user equipment (UE) may report physical uplink control channel (PUCCH) group capabilities to a network. The UE receives a request from a network for radio access capability information and reports whether a single PUCCH group having a plurality of component carriers (CC) using more than two numerologies across the CCs is supported. The UE may also receive a request from a network for radio access
(Continued)

capability information and report whether a PUCCH group having a plurality of CC across multiple frequency bands is supported, wherein the report is configured per band combination (BC). The UE may also receive a request from a network for radio access capability information and report support for a PUCCH location configuration for a PUCCH group having a plurality of CC across multiple frequency bands, the PUCCH location configuration indicating which bands in a band combination (BC) may be used for the PUCCH.

19 Claims, 5 Drawing Sheets

(51) Int. Cl.

| | |
|---|---|
| ***H04L 27/26*** | (2006.01) |
| ***H04W 36/14*** | (2009.01) |
| ***H04W 72/21*** | (2023.01) |
| ***H04W 72/51*** | (2023.01) |

(52) U.S. Cl.
CPC ..... *H04L 27/2646* (2013.01); *H04W 36/1446* (2023.05); *H04W 72/0453* (2013.01); *H04W 72/21* (2023.01); *H04L 5/0044* (2013.01)

(58) Field of Classification Search
CPC ... H04L 5/001; H04L 5/0044; H04L 12/2626; H04L 27/2646
See application file for complete search history.

(56) References Cited

U.S. PATENT DOCUMENTS

2020/0351869 A1* 11/2020 Oh ..................... H04W 72/044
2021/0037481 A1* 2/2021 Kim ................... H04W 52/365
2021/0105812 A1* 4/2021 Rastegardoost .......... H04L 1/08

FOREIGN PATENT DOCUMENTS

| | | |
|---|---|---|
| CN | 107852616 | 3/2018 |
| CN | 107925870 A | 4/2018 |
| WO | 2016/011228 | 1/2016 |
| WO | 2019/215932 A1 | 11/2019 |
| WO | 2019/220595 A1 | 11/2019 |

OTHER PUBLICATIONS

Intel Corp., "Update of UE capabilities", 3GPP TSG-RAN Meeting #82, RP-182813, Dec. 13, 2018, 27 sheets.
Huawei, "Summary of the mail discussion on NR spectrum utilization efficiency enhancements", 3GPP TSG-RAN Meeting #80, RP-181294, Jun. 14, 2018, 7 sheets.
Moderator et al, "Summary on [102-e-NR-UEFeatures-Others-01]", 3GPP TSG RAN WG1 #102e, R1-2007022, Aug. 29, 2020, 32 sheets.

* cited by examiner

500

| Nr of Band Entries: | 5 | 4 | 3 |
|---|---|---|---|
| Length of Bit-String: | 15 | 7 | 3 |
| Bit String Position | Cell grouping option (0= first cell group, 1= second cell group) | | |
| 1 | 00001 | 0001 | 001 |
| 2 | 00010 | 0010 | 010 |
| 3 | 00011 | 0011 | 011 |
| 4 | 00100 | 0100 | |
| 5 | 00101 | 0101 | |
| 6 | 00110 | 0110 | |
| 7 | 00111 | 0111 | |
| 8 | 01000 | | |
| 9 | 01001 | | |
| 10 | 01010 | | |
| 11 | 01011 | | |
| 12 | 01100 | | |
| 13 | 01101 | | |
| 14 | 01110 | | |
| 15 | 01111 | | |

USER EQUIPMENT (UE) AND METHOD FOR REPORTING TO THE NETWORK AN INDICATION THAT A SINGLE PHYSICAL UPLINK CONTROL CHANNEL (PUCCH) GROUP HAVING A PLURALITY OF COMPONENT CARRIERS (CC) USING MORE THAN FOUR NUMEROLOGIES ACROSS THE CCs IS SUPPORTED

BACKGROUND INFORMATION

A user equipment (UE) may connect to either one or both of a 5G new radio (NR) radio access technology (RAT) and Long-Term Evolution (LTE) RAT. The UE may support standalone carrier aggregation (CA) on LTE, CA on NR (NR-CA), or a variety of dual-connectivity (DC) functionalities in which a plurality of component carriers (CCs) are combined across LTE and NR. Each CC may represent a channel that facilitates communication between the UE and the network over a particular frequency band. A plurality of CCs may correspond to the same frequency band, each CC may correspond to a different band, or a combination of CCs across the same frequency band and different frequency bands may be used.

Physical uplink control channel (PUCCH) cell grouping is supported in NR and may include carriers being grouped into a primary PUCCH group and a secondary PUCCH group. Various restrictions are currently specified for PUCCH group configurations depending on the type of CA or DC functionality being used. Current PUCCH group-related UE capability is limited in the following ways. First, a UE is not currently allowed to support a single PUCCH group with more than 2 numerologies. Second, a UE is not currently allowed to report the supported PUCCH group configuration, e.g. which operating bands can be configured in the same PUCCH group. Third, a UE is not currently allowed to report the location supported for the PUCCH, e.g. in which band of a multi-band PUCCH group the PUCCH can be configured.

SUMMARY

Some exemplary embodiments are related to one or more processors configured to perform operations. The operations include receiving a request from a network for radio access capability information and reporting to the network whether a single physical uplink control channel (PUCCH) group having a plurality of component carriers (CC) using more than two numerologies across the CCs is supported.

Other exemplary embodiments are related to one or more processors configured to perform operations. The operations include receiving a request from a network for radio access capability information and reporting to the network whether a physical uplink control channel (PUCCH) group having a plurality of component carriers (CC) across multiple frequency bands is supported, wherein the report is configured per band combination (BC).

Still further exemplary embodiments are related to one or more processors configured to perform operations. The operations include receiving a request from a network for radio access capability information and reporting to the network support for a physical uplink control channel (PUCCH) location configuration for a PUCCH group having a plurality of component carriers (CC) across multiple frequency bands, the PUCCH location configuration indicating which bands in a band combination (BC) may be used for the PUCCH.

DETAILED DESCRIPTION

Figure 1:
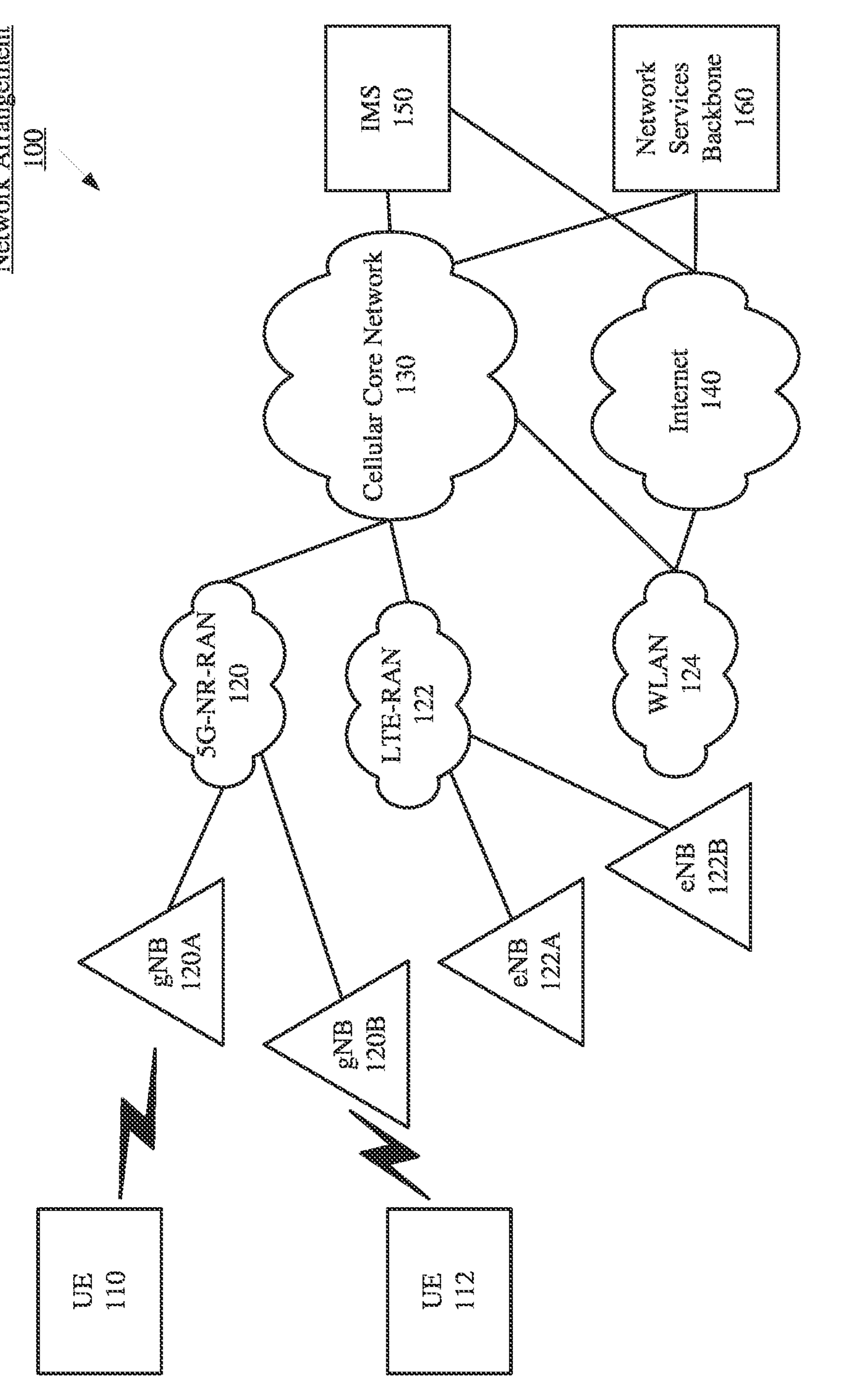
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments describe systems and methods for enhanced reporting of user equipment (UE) physical uplink control channel (PUCCH) cell group related capabilities.

The exemplary embodiments are described with regard to a UE. However, the use of a UE is merely for illustrative purposes. The exemplary embodiments may be utilized with any electronic component that may establish a connection with a network and is configured with the hardware, software, and/or firmware to exchange information and data with the network. Therefore, the UE as described herein is used to represent any electronic component.

The exemplary embodiments are also described with regard to a network that includes a 5G new radio (NR) radio access technology (RAT) and a Long-Term Evolution (LTE) RAT. The network may support standalone carrier aggregation (CA) on LTE, CA on NR (NR-CA), or a variety of dual-connectivity (DC) functionalities in which a plurality of component carriers (CCs) are combined across LTE and NR, to be described in detail below. Each CC may represent a channel that facilitates communication between the UE and the network over a particular frequency band. A plurality of CCs may correspond to the same frequency band, each CC may correspond to a different band, or a combination of CCs across the same frequency band and different frequency bands may be used. Further, each CC has a particular bandwidth, and the more CCs the UE is configured with the more bandwidth that is available for communications with the network.

The UE may be configured to access 5G NR services when operating in non-standalone (NSA) mode for 5G or standalone (SA) mode for 5G. In NSA mode, the UE may establish a connection with both 5G NR RAT and LTE RAT using Dual Connectivity (DC). Throughout this description, DC may generally refer to a UE that is configured to transmit and receive on a plurality of CCs corresponding to cells associated with different RATs. For example, when in NSA mode for 5G, the UE may achieve DC via a master cell group (MCG) corresponding to LTE and a secondary cell group (SCG) corresponding to 5G NR, e.g., E-UTRA NR Dual Connectivity with E-UTRA connected to EPC (EN-DC) or vice versa, where the MCG corresponds to NR and the SCG corresponds to LTE, e.g., NR E-UTRA Dual Connectivity (NE-DC). Other DC functionalities include E-UTRA NR Dual Connectivity with E-UTRA connected to 5GC (NGEN-DC) and NR-NR Dual Connectivity (NR-DC). Each cell group may include at least one cell for a corresponding RAT. In one exemplary scenario of DC, from a protocol stack perspective, the UE may have a control plane and a user plane with the 5G NR network while also having a control plane and a user plane with the LTE network. In another exemplary scenario of DC, the UE may have a control plane with the LTE network and a user plane with the 5G NR network or vice versa. Thus, when operating in NSA mode for 5G, the UE may have a simultaneous connection to 5G NR and LTE. However, it should be noted, that when operating in NSA mode for 5G, the UE may transition between instances of being connected on one RAT (e.g., 5G NR, LTE, Legacy, etc.) to being connected on a multiple RATs (e.g., DC).

The following examples provide a general overview of the type of network configuration that may facilitate DC functionality. In a first exemplary configuration, the network connection may use the evolved packet core (EPC) of LTE and the UE may communicate with at least one LTE cell serving as the master cell group (MCG) and at least one NR cell serving as a secondary cell group (SCG). In a second exemplary configuration, the network connection may use the 5G core network (5GC) and the UE may communicate with at least one NR cell serving as the MCG and at least one LTE cell serving as the SCG. In a third exemplary NSA configuration, the network connection may use the 5GC and the UE may communicate with at least one LTE cell serving as the MCG and at least one NR cell serving as the SCG. However, the exemplary embodiments are not limited to the examples provided above related to either the protocol stack or the network configuration. The exemplary embodiments apply to DC functionality being achieved in any appropriate manner.

In stand-alone (SA) mode for 5G, the UE may connect to one RAT at a particular time. Accordingly, the network connection may transition between different RATs (e.g., 5G NR, LTE, Legacy, etc.). For example, at a first time, the network connection may use the 5GC and the UE may communicate with the network via at least one NR cell. During operation, the UE may experience a handover from the 5G to LTE, where the network connection may then use the EPC and the UE may communicate with the LTE network via at least one LTE cell. However, any reference to a particular type of RAT, core network, cell or mode of operation is merely provided for illustrative purposes.

As mentioned above, the UE may also be configured with carrier aggregation (CA) functionality. The CA functionality may comprise a primary serving cell (PCell) providing a primary component carrier (PCC) and at least one secondary serving cell (SCell) providing a secondary component carrier (SCC) that correspond to the same RAT being used to facilitate communication with the network. The PCC may be used, in part, for control information such as scheduling requests, uplink grants, downlink grants, etc. CA functionality enables the PCC and at least one SCC to combine bandwidths to exchange data with the UE. Thus, with CA, the PCC may provide a first portion of a total bandwidth for data to be exchanged while the SCC may provide a second portion of the total bandwidth. The combination of a PCC and a single SCC may be characterized as a CC combination that includes two carriers. To further increase the total available bandwidth for data to be exchanged with the UE, additional SCCs may be incorporated. For example, with CA for LTE, there may be CC combinations that include, but are not limited to, two carriers, four carriers, five carriers, eight carriers, ten carriers, thirty-two carriers, etc. With CA for 5G NR there may be CC combinations that include, but are not limited to, two carriers, five carriers, ten carriers, twelve carriers, sixteen carriers, twenty carriers, twenty-five carriers, thirty-two carriers, sixty-four carriers, etc.

5G NR licensed frequency bands are separated into two frequency ranges, i.e. Frequency Range 1 (FR1) including bands under 6 Hz and Frequency Range 2 (FR2) including bands in the millimeter wave (mmWave) range, e.g. up to 52.6 GHz. Operation on unlicensed frequency bands, e.g. NR-U operation, is also allowed on an ad-hoc basis, subject to a listen-before-talk (LBT) operation to ensure that the unlicensed channel is available. Unlicensed bands may include e.g. 2.4 GHz, 5 GHz, 6 GHz and 60 GHz unlicensed bands as well as 3.5 GHz and 37 GHz shared access bands. Certain numerologies (waveform configurations e.g. SCSs) may be used only for particular channels and/or signals. For example, FR1 may allow only 15, 30 or 60 kHz SCS while FR2 may allow only 60, 120 or 240 kHz SCS.

A UE may support different functionalities between frequency division duplexing (FDD) and time division duplexing (TDD), between FR1, FR2 and unlicensed operation, and/or between radio access technologies (RATs) and CA, DC or related functionalities associated therewith. The UE reports capability parameters related to those mentioned above and other parameters to the network so that the network may control network operations in accordance with the UE capability.

Network/Devices

FIG. 1 shows an exemplary network arrangement 100 according to various exemplary embodiments. The exemplary network arrangement 100 includes a plurality of UEs 110, 112. Those skilled in the art will understand that the UEs may be any type of electronic component that is configured to communicate via a network, e.g., a component of a connected car, a mobile phone, a tablet computer, a smartphone, a phablet, an embedded device, a wearable, an Internet of Things (IoT) device, etc. It should also be understood that an actual network arrangement may include any number of UEs being used by any number of users. Thus, the example of two UEs 110, 112 is merely provided for illustrative purposes. In some of the exemplary embodiments described below, groups of UEs may be employed to conduct respective channel measurements.

The UEs 110, 112 may communicate directly with one or more networks. In the example of the network configuration 100, the networks with which the UEs 110, 112 may wirelessly communicate are a 5G NR radio access network (5G NR-RAN) 120, an LTE radio access network (LTE-RAN) 122 and a wireless local access network (WLAN) 124. Therefore, the UEs 110, 112 may include a 5G NR chipset to communicate with the 5G NR-RAN 120, an LTE chipset to communicate with the LTE-RAN 122 and an ISM chipset to communicate with the WLAN 124. However, the UEs 110, 112 may also communicate with other types of networks (e.g. legacy cellular networks) and the UE 110 may also communicate with networks over a wired connection. With regard to the exemplary embodiments, the UEs

110, 112 may establish a connection with the 5G NR-RAN 120 and/or the LTE-RAN 122.

The 5G NR-RAN 120 and the LTE-RAN 122 may be portions of cellular networks that may be deployed by cellular providers (e.g., Verizon, AT&T, T-Mobile, etc.). These networks 120, 122 may include, for example, cells or base stations (Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set. The WLAN 124 may include any type of wireless local area network (WiFi, Hot Spot, IEEE 802.11x networks, etc.).

The UEs 110, 112 may connect to the 5G NR-RAN 120 via at least one of the next generation nodeB (gNB) 120A and/or the gNB 120B. Reference to two gNBs 120A, 120B is merely for illustrative purposes. The exemplary embodiments may apply to any appropriate number of gNBs. For example, the UEs 110, 112 may simultaneously connect to and exchange data with a plurality of gNBs in a multi-cell CA configuration. The UEs 110, 112 may also connect to the LTE-RAN 122 via either or both of the eNBs 122A, 122B, or to any other type of RAN, as mentioned above. In the network arrangement 100, the UE 110 is shown as having a connection to the gNB 120A, while the UE 112 is shown as having a connection to gNB 120B.

In addition to the networks 120, 122 and 124 the network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network, e.g. the 5GC for NR. The cellular core network 130 also manages the traffic that flows between the cellular network and the Internet 140.

The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
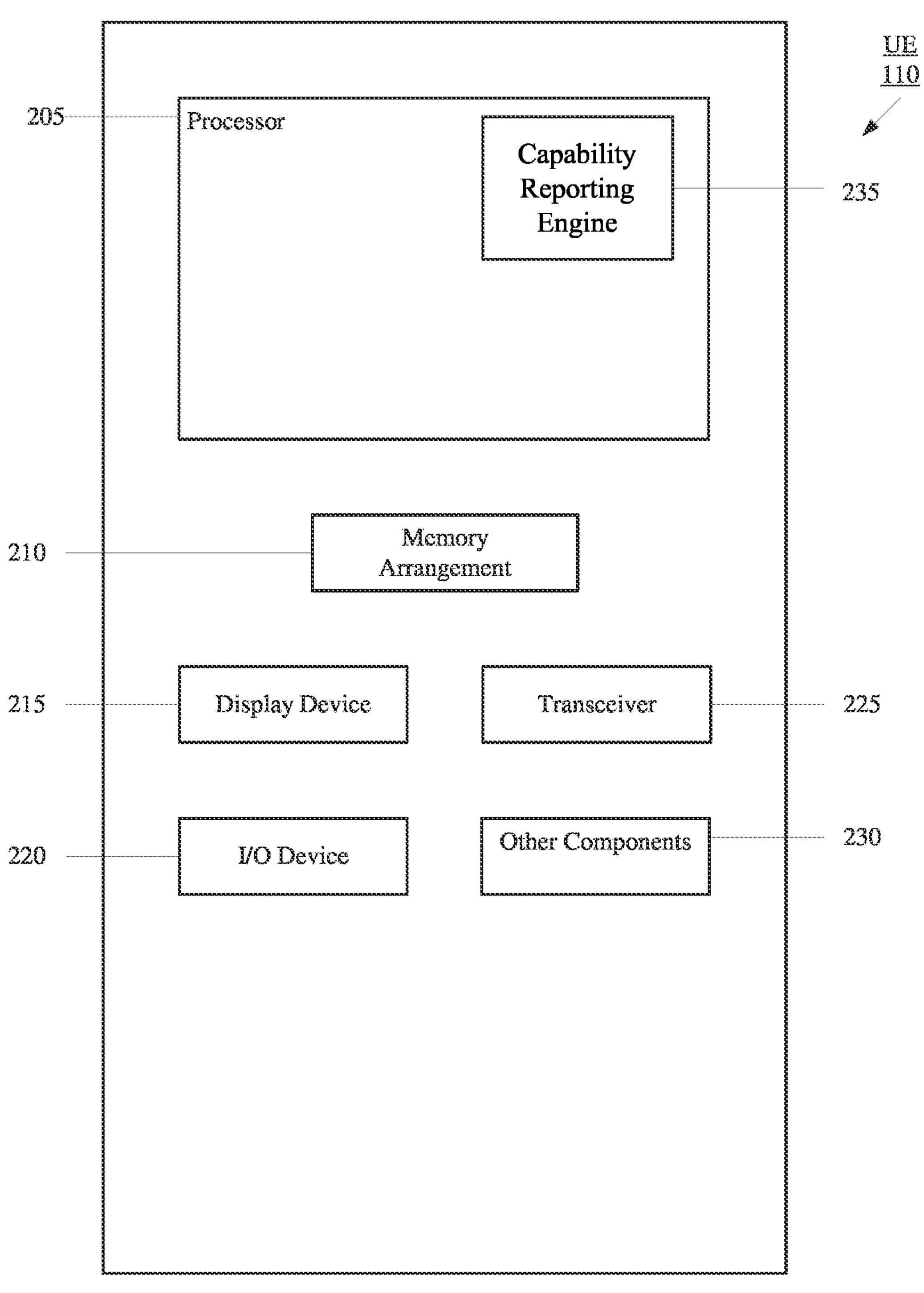
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may represent any electronic device and may include a processor 205, a memory arrangement 210, a display device 215, an input/output (I/O) device 220, a transceiver 225, and other components 230. The other components 230 may include, for example, an audio input device, an audio output device, a battery that provides a limited power supply, a data acquisition device, ports to electrically connect the UE 110 to other electronic devices, sensors to detect conditions of the UE 110, etc. The UE 110 illustrated in FIG. 2 may also represent the UE 112.

The processor 205 may be configured to execute a plurality of engines for the UE 110. For example, the engines may include a capability reporting engine 235 for performing operations including reporting UE capabilities related to a supported number of numerologies in a PUCCH cell grouping, supported PUCCH cell groupings and supported PUCCH locations within a cell grouping.

The above referenced engine being an application (e.g., a program) executed by the processor 205 is only exemplary. The functionality associated with the engines may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G-NR RAN 120, the LTE RAN 122 etc. Accordingly, the transceiver 225 may operate on a variety of different frequencies or channels (e.g., set of consecutive frequencies). For example, the transceiver 225 may operate on the unlicensed spectrum when e.g. NR-U is configured.

Figure 3:
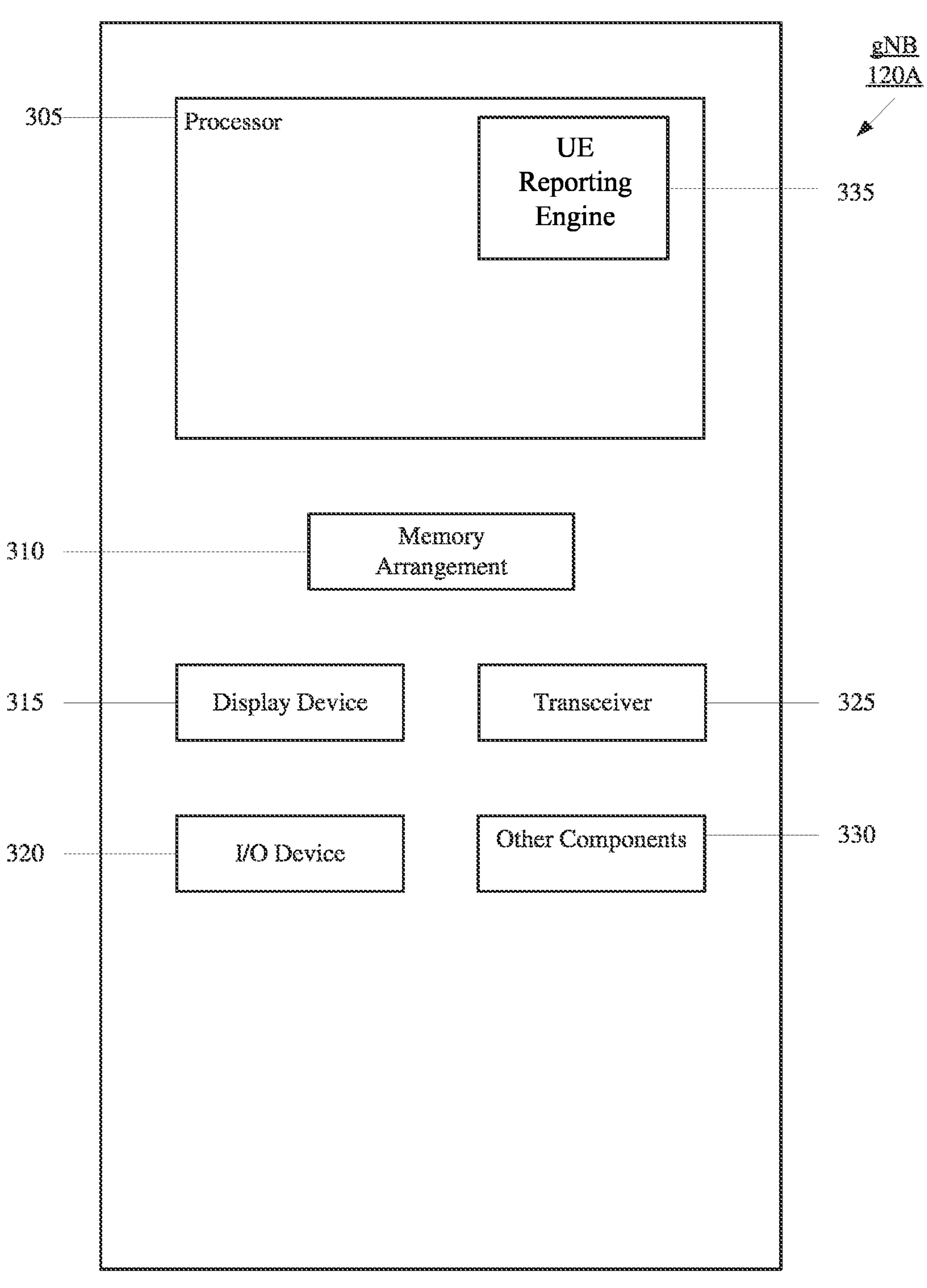
FIG. 3 shows an exemplary network cell according to various exemplary embodiments.

FIG. 3 shows an exemplary network cell, in this case gNB 120A, according to various exemplary embodiments. As noted above with regard to the UE 110, the gNB 120A may represent a cell providing services as a PCell or an SCell, or in a standalone configuration with the UE 110. The gNB 120A may represent any access node of the 5G NR network through which the UEs 110, 112 may establish a connection and manage network operations. The gNB 120A illustrated in FIG. 3 may also represent the gNB 120B.

The gNB 120A may include a processor 305, a memory arrangement 310, an input/output (I/O) device 320, a transceiver 325, and other components 330. The other components 330 may include, for example, an audio input device, an audio output device, a battery, a data acquisition device, ports to electrically connect the gNB 120A to other electronic devices, etc.

The processor 305 may be configured to execute a plurality of engines of the gNB 120A. For example, the engines may include a UE reporting engine 335 for performing operations including transmitting a request for UE capabilities and receiving an indication of UE support for capabilities including support for a number of numerologies in a PUCCH cell grouping, support for PUCCH cell groupings and support for PUCCH locations within a cell grouping.

The above noted engines each being an application (e.g., a program) executed by the processor 305 is only exemplary. The functionality associated with the engines may also be represented as a separate incorporated component of the gNB 120A or may be a modular component coupled to the gNB 120A, e.g., an integrated circuit with or without firmware. For example, the integrated circuit may include input circuitry to receive signals and processing circuitry to process the signals and other information. In addition, in some gNBs, the functionality described for the processor 305 is split among a plurality of processors (e.g., a baseband processor, an applications processor, etc.). The exemplary embodiments may be implemented in any of these or other configurations of a gNB.

The memory 310 may be a hardware component configured to store data related to operations performed by the UEs 110, 112. The I/O device 320 may be a hardware component or ports that enable a user to interact with the gNB 120A. The transceiver 325 may be a hardware component configured to exchange data with the UEs 110, 112 and any other UE in the system 100. The transceiver 325 may operate on a variety of different frequencies or channels (e.g., set of consecutive frequencies). Therefore, the transceiver 325 may include one or more components (e.g., radios) to enable the data exchange with the various networks and UEs.

UE Capability Design for PUCCH Group

Physical uplink control channel (PUCCH) cell grouping is supported in New Radio (NR) and may include carriers being grouped into a primary PUCCH group whose UL control information is transmitted on the PUCCH of a primary carrier and a secondary PUCCH group whose UL control information is transmitted on the PUCCH of a secondary carrier. Various restrictions are currently specified for PUCCH group configurations. For example, in EN-DC, NGEN-DC and NE-DC, the following limitations are currently imposed. First, at most one PUCCH group per FR is allowed. Second, if two PUCCH groups are configured (one for FR1 and one for FR2), the FR2 PUCCH group has to have the same SCS among all the cells in FR2. Third, each PUCCH group is allowed to have up to 2 different SCS.

In another example, in NR-CA (standalone CA on NR), the following limitations are imposed. First, at most two PUCCHs groups can be configured. Second, each PUCCH group is allowed to have up to 2 different SCS. In still another example, in NR-DC (NR-NR Dual Connectivity), the following limitations are imposed. First, at most one PUCCH group per cell group (CG) is allowed. Second, only a same numerology is supported in the CG with carriers only in FR2. Third, each PUCCH group is allowed to have up to 2 different SCS. It is noted that, in Rel-15, only FR1+FR2 CG is allowed, e.g., one CG in FR1 and one CG in FR2, and, Rel-16 potentially allows CG with both FR1 and FR2 which becomes a corner case.

Further limitations are imposed for the following frequency groups (FG). First, in FG6-7, for two NR PUCCH groups with a same numerology, only a same SCS across both PUCCH groups, for all carriers for both data and control, is supported. Second, in FG6-8, for NR PUCCH groups having a different numerology, only a different SCS across both PUCCH groups, for all carriers for both data and control, is supported. Third, in FG6-9, for different numerologies across NR carriers within the same NR PUCCH group, with the PUCCH on a carrier of a smaller SCS, up to 2 different SCS is supported, with the PUCCH using the smaller SCS. Fourth, in FG6-9a, for different numerologies across NR carriers within the same NR PUCCH group, with the PUCCH on a carrier of a larger SCS, up to 2 different SCS is supported, with the PUCCH on a carrier of a larger SCS.

Current PUCCH group related capability, as described above, is limited in the following ways. First, a UE is not currently allowed to support a single PUCCH group with more than 2 numerologies. Second, a UE is not currently allowed to report the supported PUCCH group configuration, e.g. which operating band can be configured in the same PUCCH group. Third, a UE is not currently allowed to report the location supported for the PUCCH e.g. in which band of a multi-band PUCCH group the PUCCH can be configured.

According to a first exemplary embodiment, a UE is configured with a capability to report whether the UE supports a single PUCCH group with more than 2 numerologies. For example, the UE may report support of a single PUCCH group with 3 different numerologies, a single PUCCH group with 4 different numerologies, etc. The report may be configured on a per band combination (BC) basis, a per UE basis, or a per feature set (FS) basis (per band per band combination). The report, if configured on a per FS basis, would have the most flexibility but also the largest overhead, while the report, if configured on a per UE basis, would have the smallest overhead but the least flexibility. A report configured on a per BC basis has a more balanced flexibility/overhead operation than the other two options mentioned above. For the UE to support a single PUCCH group with 4 different numerologies, it may or may not be a prerequisite that the UE support a single PUCCH group with 3 different numerologies.

Regarding support of a single PUCCH group with more than 2 numerologies, Rel-15 UE is not expected to support this capability. Rel-16, however, may support this capability if a reporting scheme, such as that described herein, is also supported.

The UE may separately indicate an additional functionality of UE support for a single PUCCH group including an unlicensed band together with a licensed band, for the single PUCCH group with 2 or more different numerologies. Additionally, the UE may separately indicate whether the UE supports more than 1 Timing Advance Group (TAG) within the same PUCCH group. The carriers in a TAG share a same UL transmission timing, so multiple TAG groups within the same PUCCH group would allow for different UL transmission timings for carriers within the group.

Figures 4, 5:
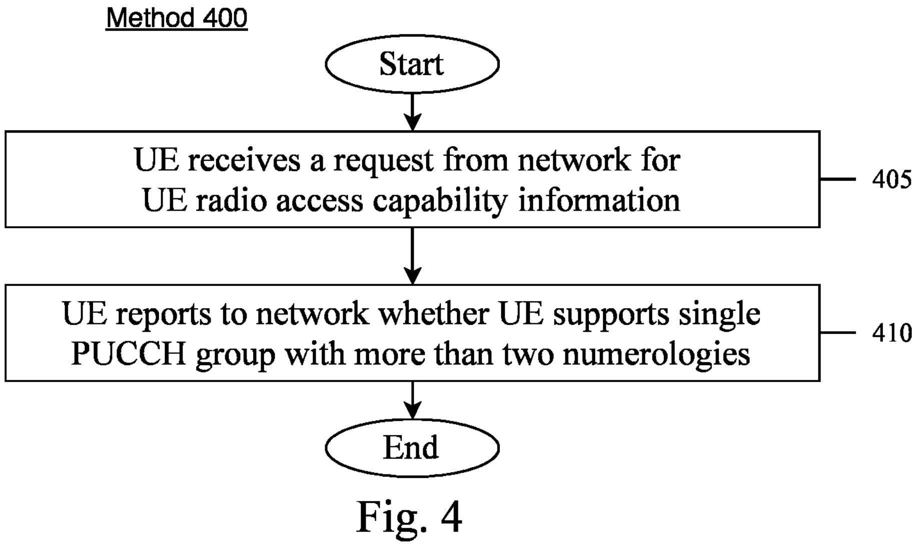
FIG. 4 shows a method for reporting user equipment (UE) support of a single physical uplink control channel (PUCCH) group having a plurality of component carriers (CC) using more than two numerologies across the CCs according to various exemplary embodiments.
FIG. 5 shows an exemplary bitmap diagram for reporting a supported cell grouping for a PUCCH group according to various exemplary embodiments.

FIG. 4 shows a method 400 for reporting user equipment (UE) support of a single physical uplink control channel (PUCCH) group having a plurality of component carriers (CC) using more than two numerologies across the CCs. In 405, the UE receives a request from the network for UE radio access capability information.

In 410, the UE reports to the network whether the UE supports the single PUCCH group with more than two numerologies. As discussed above, the report may be configured per BC, per UE or per FS. Additionally, the UE may separately report whether the UE supports a single PUCCH group containing an unlicensed operating band together with a licensed band, and whether the UE supports more than one TAG in the same PUCCH group.

According to other exemplary embodiments, a UE can report a supported cell grouping for a PUCCH group for each band combination (BC) of a plurality of operating bands to be used. According to one option, the reporting may be similar to the LTE cell grouping capability for Asynchronous (Async) LTE-DC. A bitmap may be used to indicate the supported cell grouping, each bit in the bitmap representing a sequence of binary bits corresponding to a band combination, in which each 0 in the bitmap represents the corresponding band being supported for the first PUCCH group and each 1 represents the corresponding band being supported for the second PUCCH group.

FIG. 5 shows an exemplary bitmap diagram 500 for reporting a supported cell grouping for a PUCCH group. For three operating band entries, three different cell groupings are possible, for each cell grouping, each band can be indicated as supported for the first PUCCH group or the second group. For four operating band entries, seven different cell groupings are possible, and for five operating band entries, fifteen different cell groupings are possible.

According to another option, for each BC, the UE may indicate whether it supports more than 1 PUCCH group per FR. This functionality may be used to separate the support of a grouping of (FR1+FR1)+(FR2) or a grouping of (FR1)+(FR1+FR2). In other words, for this option, the UE can indicate whether frequency bands from more than one FR can be grouped together.

In still another option, the UE may indicate whether the UE supports more than 1 PUCCH group per band. This option may be particularly applicable to intra-band NR-CA, wherein, within a FR, multiple PUCCH groups may be configured.

In still another option, the UE may report the supported cell grouping for the PUCCH group for one or more or all of the following scenarios: system frame number (SFN) synchronous (SFN-Sync) NR-CA, slot-sync NR-CA, Async NR-CA, Sync NR-DC and Async NR-DC.

Figure 6:
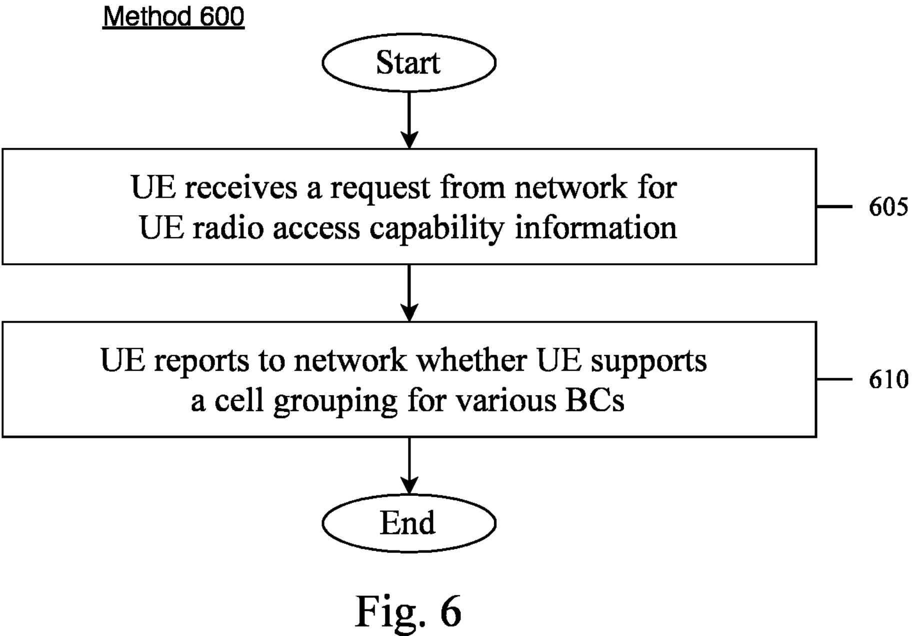
FIG. 6 shows a method for reporting user equipment (UE) support of cell groupings for various band combinations (BCs according to various exemplary embodiments).

FIG. 6 shows a method 600 for reporting user equipment (UE) support of cell groupings for various band combinations (BCs). In 605, the UE receives a request from the network for UE radio access capability information.

In 610, the UE reports to the network whether the UE supports a cell grouping for various BCs. As discussed above, a bitmap may be used to indicate a cell grouping and whether the indicated grouping is supported. In other options, the UE can indicate whether the UE supports more than one PUCCH group per FR, whether the UE supports more than one PUCCH group per band, or whether the UE supports a PUCCH group for the various CA or DC scenarios discussed above.

According to a third exemplary embodiment, the UE may indicate support for a PUCCH location configuration amongst the bands in a band combination. In one option, for PUCCH location capability reporting, the capability can be reported as per feature set (FS) (per band per band combination). For each band, if the UE reports "Support", it indicates that the UE supports the PUCCH to be configured in that band. For example, for a three band BC (B1, B2, B3), if the UE reports (support, support, not support), it means the PUCCH can be configured in either B1 or B2, but cannot be configured in B3.

In a second option, for PUCCH location capability reporting, the capability can be reported as a bitmap with respect to SCS. For example, the bitmap may be ordered as {smallest SCS, second smallest SCS, third smallest SCS}. The corresponding 1 in the bitmap indicates that the UE supports the PUCCH to be configured on the bands with the corresponding SCS.

In a third option, for PUCCH location capability reporting, the capability can be reported as a bitmap with respect to Frequency Range (FR). For example, 1 bit may be used to indicate FR1 (bit=0) or FR1+FR2 (bit=1). In this example, FR1 is always supported for the PUCCH location, and FR2 may be optional. In another example, 2 bits may be used to separately indicate FR1 or FR2, or both.

In a fourth option, for PUCCH location capability reporting, the capability can be reported as a bitmap with respect to Frequency Range (FR) and licensed/unlicensed bands. The fourth option is similar to the third option, however, includes an option for indicating support for the PUCCH on an unlicensed band. For example, a 3 bit bitmap may be used to indicate {FR1 licensed, FR2 licensed, FR1 unlicensed} (it is noted that FR2 unlicensed is not currently supported for a PUCCH location in DC operation). Certain prerequisite may be enforced for this option, for example, that the UE has to support PUCCH location on FR1.

In a fifth option, for PUCCH location capability reporting, the capability can be reported as a bitmap with respect to Frequency Range (FR), license/unlicensed and TDD/FDD. For example, a 4 bit bitmap may be used to indicate {FR1 FDD licensed, FR1 TDD licensed, FR2 TDD licensed, FR1 TDD unlicensed} (it is noted that FR2 FDD and unlicensed FDD is not currently supported for a PUCCH location in DC operation).

Figure 7:
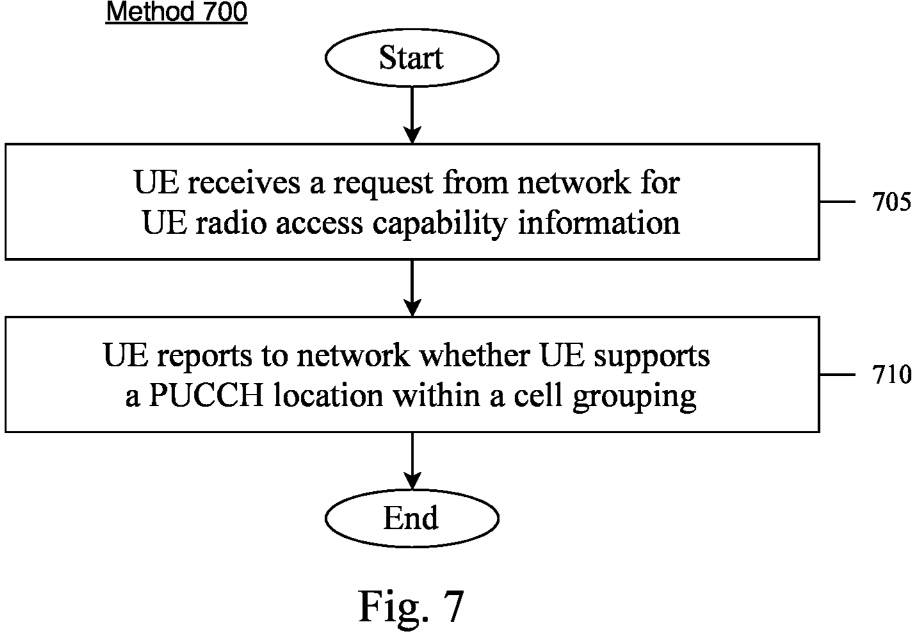
FIG. 7 shows a method for reporting user equipment (UE) support of a PUCCH location within a cell grouping according to various exemplary embodiments.

FIG. 7 shows a method 700 for reporting user equipment (UE) support of a PUCCH location within a cell grouping. In 705, the UE receives a request from the network for UE radio access capability information.

In 710, the UE reports to the network whether the UE supports a PUCCH location within a cell grouping. As discussed above, the report may be configured per FS. In other options, the report may be configured with respect to SCS, with respect to FR, with respect to FR and licensed/unlicensed, or with respect to FR, licensed/unlicensed and TDD/FDD.

According to a fourth exemplary embodiment, a UE is configured to be backward compatible with earlier releases. For example, a UE with only the capabilities described herein may not be compatible with a network operating on an earlier release. To address the potential non-backward-compatibility (NBC) issue, for the 4 PUCCH group-related capabilities discussed above (FG6-7, FG6-8, FG6-9 and FG6-9a), the previous group-related capabilities can be replicated and reported to the network, in addition to the enhanced capabilities described above.

To address the NBC issue, for the capability report, the UE may include, for FG6-7, twoPUCCH-Group->twoPUCCH-Group-r16, for FG6-8, diffNumerologyAcrossPUCCH-Group->diffNumerologyAcrossPUCCH-Group-r16, for FG6-9, diffNumerologyWithinPUCCH-GroupSmallerSCS->diffNumerologyWithinPUCCH-GroupSmallerSCS-r16, and for FG6-9a, diffNumerologyWithinPUCCH-GroupLargerSCS->diffNumerologyWithinPUCCH-GroupLargerSCS-r16. The detailed description for the earlier release may be incorporated into the new Rel-16 PUCCH group related capability design.

Certain PUCCH group support may be a prerequisite of the other PUCCH group support. In a first example, support of (FR1)+(FR1+FR2) can be a prerequisite of support for (FR1+FR1)+(FR2) and (FR1+FR1+FR2). In a second example, support of (FR1+FR1)+(FR2) can be a prerequisite of support for (FR1)+(FR1+FR2) and (FR1+FR1+FR2). In a third example, for a three band BC with three different numerologies, support of two PUCCH groups can be a prerequisite for support of a single PUCCH group.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. In a further example, the exemplary embodiments of the above described method may be embodied as a program containing lines of code stored on a non-transitory computer readable storage medium that, when compiled, may be executed on a processor or microprocessor.

Although this application described various aspects each having different features in various combinations, those skilled in the art will understand that any of the features of one aspect may be combined with the features of the other aspects in any manner not specifically disclaimed or which is not functionally or logically inconsistent with the operation of the device or the stated functions of the disclosed aspects.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

The invention claimed is:

1. One or more processors configured to perform operations comprising:

receiving a request from a network for radio access capability information; and reporting to the network an indication that a single physical uplink control channel (PUCCH) group having a plurality of component carriers (CC) using more than four numerologies across the CCs is supported, without indicating that that a single PUCCH group with three numerologies across the CCs is supported.

2. The one or more processors of claim 1, wherein the report is configured per band combination (BC).

3. The one or more processors of claim 1, wherein the operations further comprise:

reporting to the network whether a single PUCCH group including an unlicensed band together with a licensed band is supported.

4. The one or more processors of claim 1, wherein the operations further comprise:

reporting to the network whether more than one timing advance group (TAG) within a single PUCCH group is supported.

5. The one or more processors of claim 1, wherein the operations further comprise:

reporting to the network whether a PUCCH group configuration is supported for release 15 (Rel-15).

6. The one or more processors of claim 1, wherein the report is configured per user equipment (UE).

7. The one or more processors of claim 1, wherein the report is configured per feature set (FS).

8. A method, comprising:

at a user equipment (UE):

receiving a request from a network for radio access capability information; and reporting to the network an indication that a single physical uplink control channel (PUCCH) group having a plurality of component carriers (CC) using more than four numerologies across the CCs is supported, without indicating that that a single PUCCH group with three numerologies across the CCs is supported.

9. The method of claim 8, wherein the report is configured per band combination (BC).

10. The method of claim 8, further comprising:

reporting to the network whether a single PUCCH group including an unlicensed band together with a licensed band is supported.

11. The method of claim 8, further comprising:

reporting to the network whether more than one timing advance group (TAG) within a single PUCCH group is supported.

12. The method of claim 8, further comprising:

reporting to the network whether a PUCCH group configuration is supported for release 15 (Rel-15).

13. The method of claim 8, wherein the report is configured per UE.

14. The method of claim 8, wherein the report is configured per feature set (FS).

15. An apparatus comprising processing circuitry coupled to a memory, the processing circuitry configured to perform operation, comprising:

receiving a request from a network for radio access capability information; and reporting to the network an indication that a single physical uplink control channel (PUCCH) group having a plurality of component carriers (CC) using more than four numerologies across the CCs is supported, without indicating that that a single PUCCH group with three numerologies across the CCs is supported.

16. The apparatus of claim 15, wherein the report is configured per band combination (BC), per user equipment (UE) or per feature set (FS).

17. The apparatus of claim 15, wherein the operations further comprising:

reporting to the network whether a single PUCCH group including an unlicensed band together with a licensed band is supported.

18. The apparatus of claim 15, wherein the operations further comprising:

reporting to the network whether more than one timing advance group (TAG) within a single PUCCH group is supported.

19. The apparatus of claim 15, wherein the operations further comprising:

reporting to the network whether a PUCCH group configuration is supported for release 15 (Rel-15).

* * * * *